(12) United States Patent
Price

(10) Patent No.: US 8,001,737 B1
(45) Date of Patent: Aug. 23, 2011

(54) CORRUGATED DECK SEALING DEVICES, APPARATUS, SYSTEMS AND METHODS OF INSTALLATION

(75) Inventor: Darrell W Price, Rockledge, FL (US)

(73) Assignee: MHUBBARD 09, LLC, Vista, CA (US)

( * ) Notice: Subject to any disclaimer, the term of this patent is extended or adjusted under 35 U.S.C. 154(b) by 527 days.

(21) Appl. No.: 11/959,047

(22) Filed: Dec. 18, 2007

(51) Int. Cl.
*E04C 2/52* (2006.01)
*F16L 5/02* (2006.01)
*E04B 5/48* (2006.01)

(52) U.S. Cl. .......... 52/220.8; 52/232; 52/577; 52/220.1; 285/136.1; 248/346.5; 277/619; 277/624

(58) Field of Classification Search ................. 52/220.8, 52/577, 741.4, 219, 220.1, 220.2, 220.3, 52/220.4, 220.5, 220.6, 220.7, 232, 302.1, 52/741.1, 742.14; 285/215, 42, 55, 136.1, 285/139.1, 139.2, 140.1; 248/49, 56, 65, 248/346.01, 346.03, 346.5; 277/619, 620, 277/624, 626, 637, 931, 933
See application file for complete search history.

(56) References Cited

U.S. PATENT DOCUMENTS

| | | | | |
|---|---|---|---|---|
| 2,928,413 | A | * 3/1960 | Hansen | 137/493.9 |
| 2,985,091 | A | 5/1961 | Hatcher | |
| 3,269,602 | A | * 8/1966 | Weber, III | 222/647 |
| 3,565,276 | A | * 2/1971 | O'Brien et al. | 220/3.3 |

(Continued)

FOREIGN PATENT DOCUMENTS

JP 59175676 A * 10/1984

OTHER PUBLICATIONS

3M(TM) Fire Barrier Cast-In Devices Brochure & Attachments, MN Cover page dated 2006, St. Paul, MN, 5 pages.

(Continued)

*Primary Examiner* — Brian E Glessner
*Assistant Examiner* — Joseph J Sadlon
(74) *Attorney, Agent, or Firm* — Brian S. Steinberger; Law Offices of Brian S. Steinberger, P.A.

(57) ABSTRACT

Devices, apparatus, systems and methods of installing one-piece sleeve assemblies corrugated decks in floors that are used for plumbing, mechanical, electrical and miscellaneous pipe applications, against water, fire and smoke. A one-piece sleeve assembly combines a resilient sealing member with perimeter extending side walls extending from a central opening that gets poured in place during the concrete pour on the corrugated deck that forms a water, fire and smoke sealed opening about the resilient sealing member and also allows for expansion and contraction of the concrete that surrounds the resilient member, a deck base having outwardly extending wings about a central opening that is aligned with the central opening of the resilient member, and clipped fire stop material that encircles a portion of the central opening of the deck base. The one piece sleeve assembly is installed in a cut out opening the corrugated deck floor so that concrete can then be poured onto the deck about the one-piece assembly. A pipe positioned through the one piece sleeve assembly is sealed in place, by that positioning, so that an outer perimeter of the pipe is sealed against allowing water, smoke and fire to pass around the pipe through the floor and allowing for expansion and contraction of the pipe that passes through the device, and fire and smoke is further prevented from passing about the outer perimeter by the fire stop material which expands from heat.

13 Claims, 11 Drawing Sheets

U.S. PATENT DOCUMENTS

| | | | | |
|---|---|---|---|---|
| 3,579,670 A * | 5/1971 | Frank | ................................ | 4/252.5 |
| 3,596,936 A * | 8/1971 | Dieckmann et al. | ........ | 285/222.1 |
| 3,940,150 A * | 2/1976 | Martin et al. | ................. | 277/430 |
| 4,219,173 A * | 8/1980 | Forbes | ................................ | 248/56 |
| 4,221,092 A * | 9/1980 | Johnson | ........................... | 52/232 |
| 4,574,402 A * | 3/1986 | Brown, Sr. | ..................... | 4/252.5 |
| 4,669,759 A * | 6/1987 | Harbeke | .................... | 285/136.1 |
| 4,748,787 A * | 6/1988 | Harbeke | ........................ | 52/741.3 |
| 4,823,527 A * | 4/1989 | Harbeke | ........................ | 52/220.8 |
| 4,827,539 A * | 5/1989 | Kiziah | ............................ | 4/252.4 |
| 4,848,043 A * | 7/1989 | Harbeke | ........................ | 52/1 |
| 5,155,957 A * | 10/1992 | Robertson et al. | ............... | 52/232 |
| 5,293,724 A | 3/1994 | Cornwall | | |
| 5,297,817 A * | 3/1994 | Hodges | ............................ | 285/15 |
| 5,346,264 A * | 9/1994 | Law et al. | .................... | 285/136.1 |
| 5,390,465 A * | 2/1995 | Rajecki | ......................... | 52/741.3 |
| 5,420,376 A * | 5/1995 | Rajecki et al. | ................. | 174/484 |
| 5,456,050 A * | 10/1995 | Ward | ................................... | 52/1 |
| 5,467,565 A * | 11/1995 | Bowman et al. | ............. | 52/220.1 |
| 5,836,554 A * | 11/1998 | Lesage | ............................ | 248/152 |
| 5,887,396 A * | 3/1999 | Thoreson | ......................... | 52/232 |
| 5,953,872 A * | 9/1999 | MacMillian et al. | ......... | 52/220.8 |
| 6,088,972 A * | 7/2000 | Johanneck | ........................ | 285/4 |
| 6,161,564 A * | 12/2000 | Cornwall | .......................... | 137/75 |
| 6,176,052 B1 * | 1/2001 | Takahashi | ........................ | 52/232 |
| 6,305,133 B1 * | 10/2001 | Cornwall | .......................... | 52/232 |
| 6,314,692 B1 * | 11/2001 | Munzenberger et al. | .... | 52/220.8 |
| 6,360,502 B1 * | 3/2002 | Stahl, Jr. | ........................... | 52/232 |
| 6,405,502 B1 | 6/2002 | Cornwall | | |
| 6,533,288 B1 * | 3/2003 | Brandner et al. | ............. | 277/630 |
| 6,643,985 B2 | 11/2003 | Munzenberger | | |
| 6,694,684 B2 * | 2/2004 | Radke et al. | ....................... | 52/98 |
| 6,792,726 B1 * | 9/2004 | Price | ................................ | 285/58 |
| 6,969,071 B2 * | 11/2005 | Berard | ........................... | 277/370 |
| 7,070,653 B2 * | 7/2006 | Frost et al. | ...................... | 118/300 |
| 7,080,486 B2 | 7/2006 | Radke et al. | | |
| 7,114,303 B2 * | 10/2006 | Cordts et al. | ................... | 52/220.8 |
| 7,459,643 B2 * | 12/2008 | de la Borbolla | ............. | 174/655 |
| 2004/0168398 A1 * | 9/2004 | Sakno et al. | .................... | 52/220.8 |
| 2004/0211138 A1 * | 10/2004 | Sakno | ............................. | 52/298 |

OTHER PUBLICATIONS

Hilti, Cast-In Firestop Device Product Information, Hilti Firestop Guide, www.us.hilti.com. 2005-2006, Tulsa, OK, pp. 14-15 and 450-451.

* cited by examiner

FIG. 7
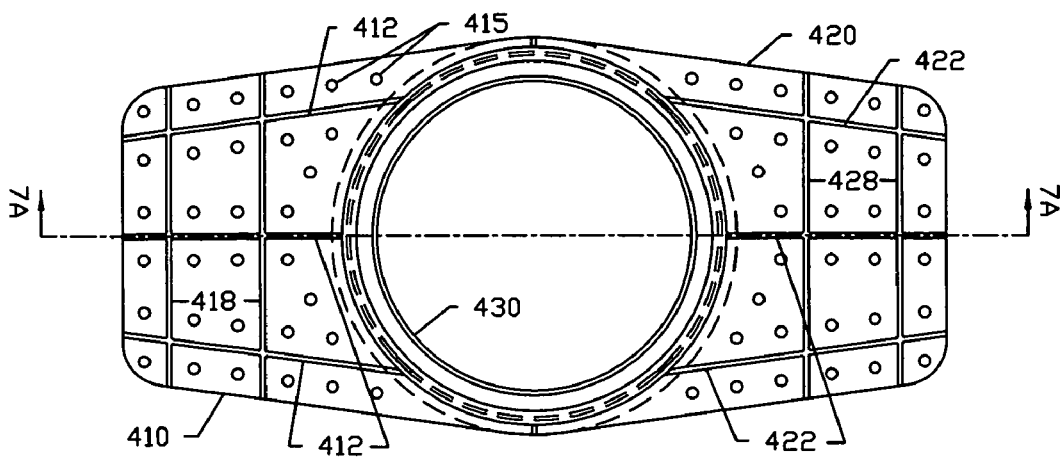
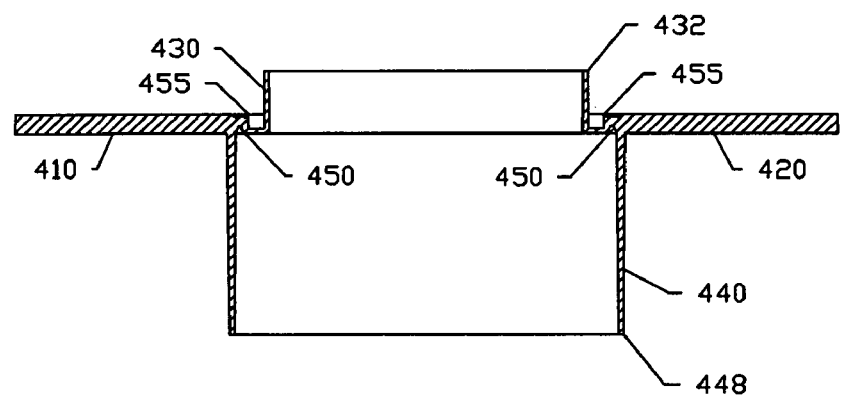
FIG. 7A

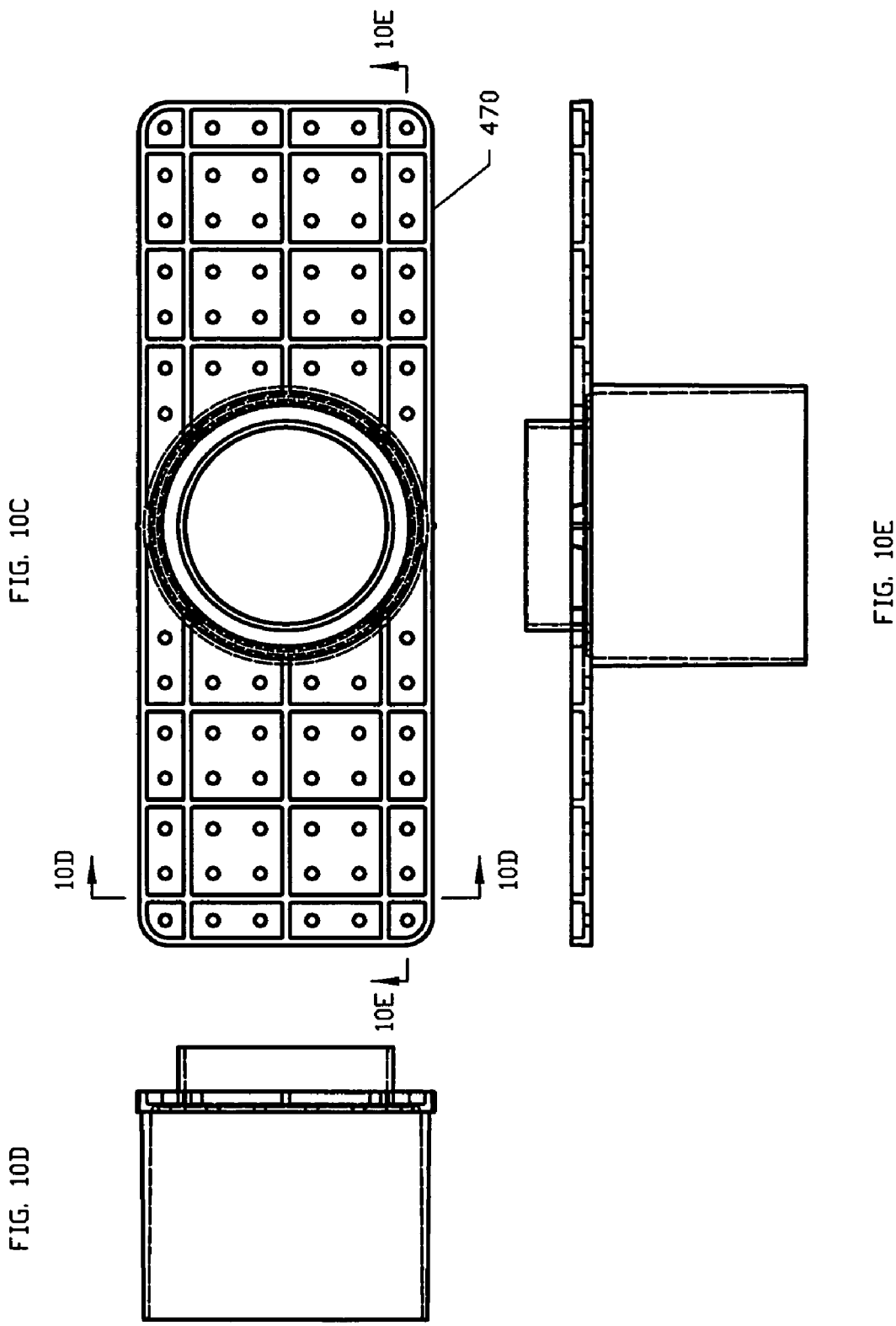

CORRUGATED DECK SEALING DEVICES, APPARATUS, SYSTEMS AND METHODS OF INSTALLATION

This invention relates to sleeving systems for openings in floors and walls, in particular to cast in place devices, apparatus, systems and methods of installation for sealing concrete floors poured over corrugated metal decks that are used for plumbing, mechanical, electrical and miscellaneous pipe applications, that seal against water, fire and smoke within the device after the pipe is passed through the device.

BACKGROUND AND PRIOR ART

Concrete floors overlaying corrugated metal decking are increasingly popular in multi-story commercial buildings and condominium buildings. In the past it has been known to extend piping systems through concrete floors by knocking out holes in the floor and boring such holes after the floor has been formed, and then extending pipes through the floors. After the pipes have been inserted into the holes, workman have had to pour additional material such as more concrete or other caulking material to seal up the spaces between the voids and the pipes extending through the voids. However, such attempts to use concrete or caulk to seal up the spaces has not been effective to future problems down the road such as from water leaks and fires and smoke that travel through any void spaces between the floors.

Any water leaks caused by overflowing waterlines, leaks, broken water lines, etc., flow downward around any openings through the flooring that is around pipes. Such water leaks are known to cause damages to the ceiling and rooms beneath the floor where the openings are around the pipes. This problem becomes compounded in high rises having multiple penetrations on each floor, where large amounts of damage often results in costly repairs and exasperation, and downtime for the occupants. Furthermore, constant leaks have been known to cause health hazards since undesirable and dangerous mold and bacteria will form around the leak areas.

Still furthermore, the crevices and cracks about the piping systems in the floors are also a conduit for fires and smoke traveling upward through a multi-floor building. Again, current sealing techniques that have included concrete and/caulk do not effectively seal these void spaces. In fact, over time natural drying effects and typical pipe movement (thermal expansion and contraction) may shrink any caulk seals which results in opening of the crevices and voids about the plumbing systems causing a pathway for fires and smoke to travel through the floors of the buildings about the plumbing systems.

Over the years various types of systems and devices have been attempted for trying to fix these sealing issues. See for example, U.S. Pat. Nos. 2,985,091 to Hatcher; 5,293,724 to Cornwall; 6,314,692 to Munzenberger et al.; 6,405,502 to Cornwall; 6,643,985 to Munzenberger; 6,694,684 and 7,080,486 to Radke et al., and devices sold by 3M and Hilti Corporation.

Specifically, the 3M devices entitled: 3M Fire Barrier Cast-In Devices and Hilti Corporation devices entitled: Cast-In Firestop devices have been sold for use over metal decks. However, these devices and the others have many problems of their own. For example, the 3M devices and Hilti Corp. devices require many installation steps that are both time consuming and costly in labor to install their devices, as well as many accessory items. In high rises having thousands of openings, the costs for these multiple installation steps can add extra labor costs and time delays that seriously affect these large building projects.

Furthermore, these devices require extra setup and finish time that include extra steps for cleaning and cutting that add additional labor and time delay costs. The multitude of installation steps increases the chances for mistakes in the installation process. Again, buildings having thousands of openings that need to be sealed with devices that require a multiple amount of installation and assembly steps increases the chances for mistakes in installing these devices in many of the floor openings. Many of these devices also when installed do not fully waterproof the entire floor openings on the inside and outside.

In addition to all of these extra steps, the individual products that are needed come in separate packages and the contractor must carry them all over the project and figure out where they all go.

Still furthermore, the 3M and Hilti devices require large amounts of materials to be used since the devices come in many parts that must be assembled together and installed. The costs multiply with multi-story buildings and condominiums having thousands or more of floor openings that need to be sealed.

Still furthermore, none of these devices is an effective complete seal against water leaks, fire and smoke passage in concrete floors having corrugated decks since the concrete shrinks, over time leaving a path for water and smoke at the intersection of the sleeve and the concrete. None of these techniques and devices described above solves all the problems addressed above.

Thus, the need exists for solutions to the above problems with the prior art.

SUMMARY OF THE INVENTION

A primary objective of the present invention is to provide single component devices, apparatus, systems and methods of installing sleeving systems for openings in floors constructed of concrete poured over corrugated metal deck that are used for plumbing, mechanical, electrical and miscellaneous pipe applications, that seal against water, fire and smoke.

A secondary objective of the present invention is to provide single component devices, apparatus, systems and methods of installing sleeving systems for openings in concrete floors over corrugated decks that have less material costs than existing systems.

A third objective of the present invention is to provide single component devices, apparatus, systems and methods of installing sleeving systems for openings in concrete floors over corrugated decks that have greater labor efficiency and less labor installation costs than existing systems.

A fourth objective of the present invention is to provide single component devices, apparatus, systems and methods of installing sleeving systems for openings in floors constructed of concrete poured over corrugated metal deck that seal voids/spaces and crevices/cracks between the concrete and the installed sleeve which accommodate the penetration of piping systems between the floors.

A fifth objective of the present invention is to provide devices, apparatus, systems and methods that allow for expansion and contraction of miscellaneous piping systems through the device and on the outside of the device where it comes in contact with the concrete while maintaining a water, fire and smoke sealed connections.

Various embodiments for use with sleeving systems for openings in floors and walls, in particular to cast in place devices, apparatus, systems and methods of installation for sealing concrete floors poured over corrugated metal decks that are used for plumbing, mechanical, electrical and miscellaneous pipe applications, that seal against water, fire and smoke within the device after the pipe is passed through the device.

A method of installing a pipe pass-through through corrugated decks, can include the steps of providing a corrugated floor deck having raised surfaces and lower surfaces with walls therebetween, providing a one-piece sleeve assembly that combines a resilient sealing member with perimeter extending side walls extending from a central opening, a deck base having outwardly extending wings about a central opening that is aligned with the central opening of the resilient member, and clipped fire stop material that encircles a portion of the central opening of the deck base, cutting a through-hole in the corrugated floor deck, installing the one-piece sleeve assembly to the through-hole of the corrugated floor deck so that the wings of the deck base overlay portions of raised surfaces on both sides of the corrugated deck that is about the through-hole in the corrugated deck, pouring concrete onto the corrugated deck about the one-piece assembly, and positioning a pipe into the through-hole so that an outer perimeter of the pipe is sealed against the resilient sealing member to seal the outer perimeter of the pipe from allowing water, smoke and fire to pass therethrough, and the fire and the smoke is further prevented from passing about the outer perimeter the fire stop material which expands from heat.

The resilient sealing member with perimeter extending side walls can include an upper cylindrical portion extending above the perimeter extending side walls, a lower cylindrical portion extending below the perimeter extending side walls, and an interior facing edge extending inwardly therebetween. At least one of the surfaces of the perimeter extending side walls can include raised ridges.

The one-piece sleeve assembly can further include an upper tubular sleeve extension that fits into the upper cylindrical portion of the resilient member and rests against the interior facing edge, and a cap member that attaches about an upper end of the sleeve extension having a raised upper edge that fits about the upper end of the sleeve extension.

Each of the wings of the deck base can include raised strengthening ribs about perimeter edges of the wings. Each of the wings of the deck base can include raised parallel ribs along at least one surface of the wings.

The deck base can include a downwardly extending cylinder that extends beneath the corrugated deck.

The clipped fire stop material can include a ring having upwardly bendable prongs that attach adjacent to the central opening through to the deck base and secures the fire ring into the concrete, and a sleeve of fire stop material that is clipped within the downwardly extending cylinder of the of the deck base.

A one piece sleeve assembly for through-hole openings in corrugated decks, the one-piece assembly can include a resilient sealing member with perimeter extending side walls extending from a central opening, a deck base having outwardly extending wings about a central opening that is aligned with the central opening of the resilient member, and a fire stop material clipped about to encircle a portion of the central opening of the deck base;

The resilient sealing member can include an upper cylindrical portion extending above the perimeter extending side walls, a lower cylindrical portion extending below the perimeter extending side walls, and an interior facing edge extending inwardly therebetween. The resilient sealing member can include raised ridges on at least one surface of the perimeter extending side walls.

The one-piece sleeve assembly further can include an upper tubular sleeve extension that fits into the upper cylindrical portion of the resilient member and rests against the interior facing edge. The one-piece sleeve assembly further can have a cap member that attaches about an upper end of the sleeve extension having a raised upper edge that fits about the upper end of the sleeve extension.

Each of the wings of the deck base can include raised strengthening ribs about perimeter edges of the wings, and/or each of the wings of the deck base can include raised parallel ribs along at least one surface of the wings.

The deck base further can further include a downwardly extending cylinder that extends beneath the corrugated deck.

The clipped fire stop material can include a ring having upwardly bendable prongs that attach adjacent to the central opening through to the deck base and secures the fire ring into the concrete, and a sleeve of fire stop material that is clipped within the downwardly extending cylinder of the of the deck base.

Further objects and advantages of this invention will be apparent from the following detailed description of the presently preferred embodiments which are illustrated schematically in the accompanying drawings.

BRIEF DESCRIPTION OF THE FIGURES

FIG. 7 is a top view of the corrugated deck wing base of FIGS. 1-3.

FIG. 7A is a cross-sectional view of the corrugated deck wing base of FIG. 7 along arrows 7A.

FIG. 10C is a top view of the corrugated deck wing base of FIGS. 10A-10B.

FIG. 10D is an end cross-sectional view of the corrugated deck wing base of FIG. 10C along arrow 10D.

FIG. 10E is a side cross-sectional view of the corrugated deck wing base of FIG. 10C along arrow 10E.

DESCRIPTION OF THE PREFERRED EMBODIMENTS

Figure 1:
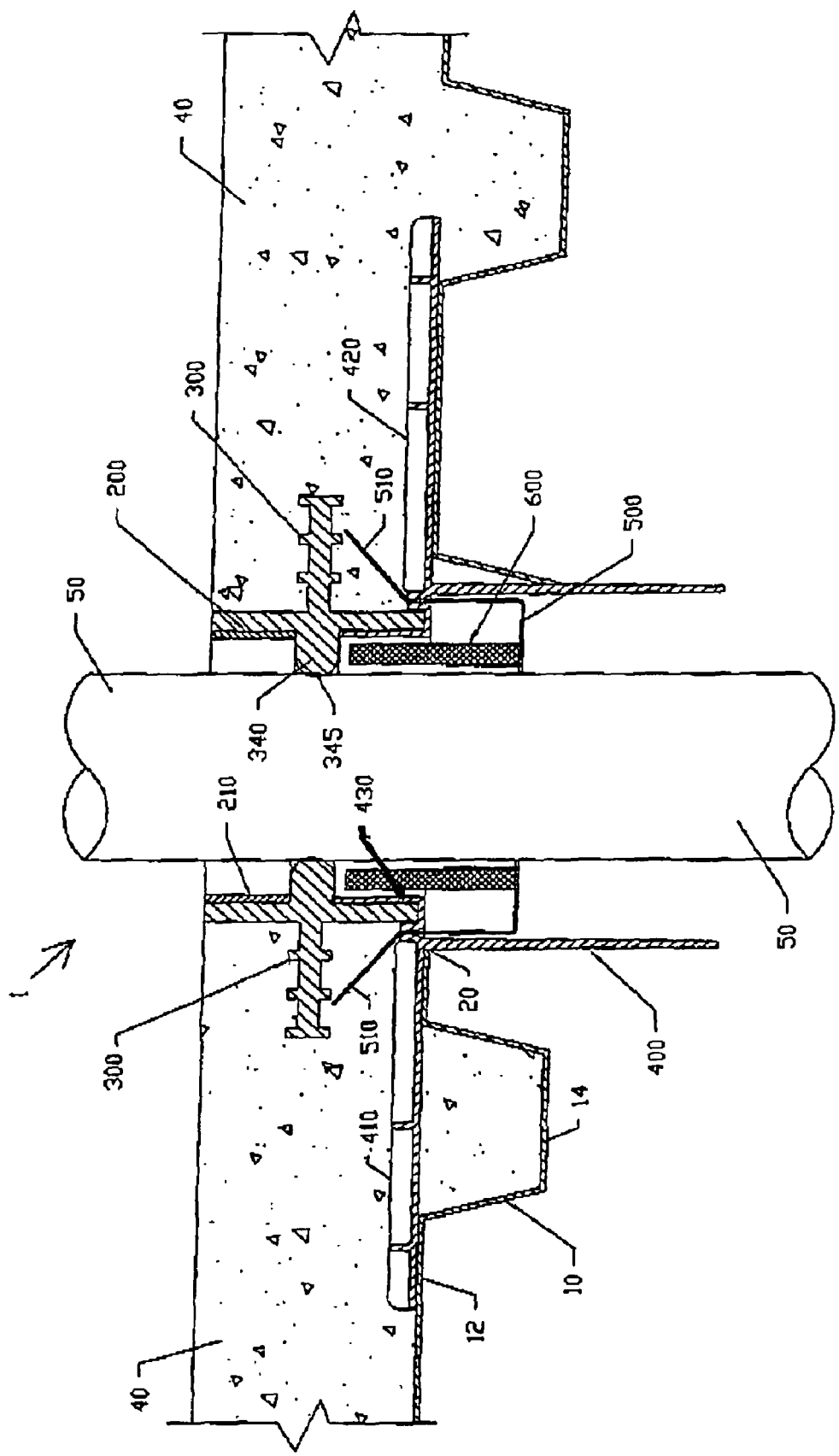
FIG. 1 is a cross-sectional view of a one-piece corrugated deck assembly embodiment installed in a corrugated deck with a concrete poured floor.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of components will now be described.
1. One-Piece Assembled Corrugated Deck assembly
10. Corrugated metal deck
12. raised surfaces of corrugated metal deck
14. lower/valley surfaces of corrugated metal deck
20. opening in corrugated metal deck/concrete floor
40. poured concrete floor
50. pipe (by others) for pass through in floor opening.
100. Top Cap for protection during concrete pour
110. conical shaped sidewalls 110
115. open bottom
120. lip edge
125. upper open top
200. Top Sleeve Extension
210. cylindrical sidewalls
220. upper edge
230. lower edge
300. Mid-Body Seal-resilient sleeve
310. upper open cylindrical end of Mid-Body Seal 300
320. lower open cylindrical end of Mid-Body Seal 300
340. inwardly protruding seal ring
342. upper ledge surface of seal ring 340
345. rounded inner edge on lip seal ring 340
348. lower ledge surface of seal ring 340
350. Mid-Body Seal ring for sealing and securing ring into the concrete
352. upper raised ridges and grooves of Mid-Body Seal Ring 350
358. lower raised ridges and grooves of Mid-Body Seal Ring 350
400. Deck wing base for securing to corrugated metal deck 10
410. Left wing of deck wing base 400
412. outwardly parallel strengthening ribs
415. small through-holes for screws to secure to corrugated metal deck 10
418. cross parallel strengthening ribs
420. Right wing of deck wing base 400
422. outwardly parallel strengthening ribs
428. cross parallel strengthening ribs
430. small diameter upper cylinder ring of deck wing base 400 that fits inside of lower open cylindrical end of Mid-Body Seal 300
432. top edge of the small diameter upper cylinder ring of deck wing base 400
440. large diameter lower cylinder ring of the of deck wing base 400
448. lower bottom edge of the large diameter lower cylinder ring 440
450. slot openings 450 for fire ring 500 to fit in
455. trough for lower open cylindrical end 320 to fit in
460 Another deck wing base
470 perimeter raised ridge about deck wings
480 parallel raised ridges
490 parallel raised ridges perpendicular to ridges 480
500. Fire Ring
510. upwardly protruding outer prongs
512. upper ends
520. upwardly protruding inner tabs
522 upper ends
530. bottom base of fire ring
535. through-holes in bottom base 530 of fire ring 500
600. Fire stop material
900 Flow chart of steps
910. Step 1, determining the slab thickness of the concrete floor
920. Step 2, cutting an opening in the corrugated deck
930. Step 3, final step of installing the one-piece sleeve assembly 1

The subject invention is an improvement over U.S. Pat. No. 6,792,726 to Price, the same inventor as that of the subject invention which is incorporated by reference. The Price '726 patent is directed to a sealing system through concrete poured floors, and has been substantially modified and improved to be used with corrugated deck surfaces as described in the subject invention.

FIG. 1 is a cross-sectional view of a corrugated deck assembly embodiment 1 installed in a corrugated deck 10 that is sealed in place by having a poured concrete floor slab that is poured afterward. The assembly 1 can include the mid-body seal 300, with top sleeve extension extending upward from a middle of the mid-body seal 300, which is interconnected to the deck wing base 400, and fire stop material 600 clipped and attached thereto by fire ring 500. The left wing 410 and right wing 420 of the deck wing base 400 overlays the raised surfaces 12 of the corrugated deck 10 on both sides of the deck wing base 400. The wings 410, 420 have a long enough length of approximately 14 inches end to end to overlay the length of the lower surface valleys 14 of the corrugated deck 10. Each deck wing 410, 420 has a length longer than the width of the lower surface valleys 14.

When assembled a pipe 50 can fit within the central opening of the corrugated one-piece assembly 1 where an inwardly protruding rounded edge 345 of mid-body seal 300 tightly seals against the outside walls of the pipe 50. The pipe 50 can be any type of pass through pipe that passes through a floor such as but not limited to plumbing pipes, electrical pipes and conduits for power and communication lines, and the like. Pipe 50 can be a PVC pipe, ABS plastic pipes, and/or metal pipes, such as but not limited to those formed from steel, galvanized steel, copper, and the like.

Figure 2:
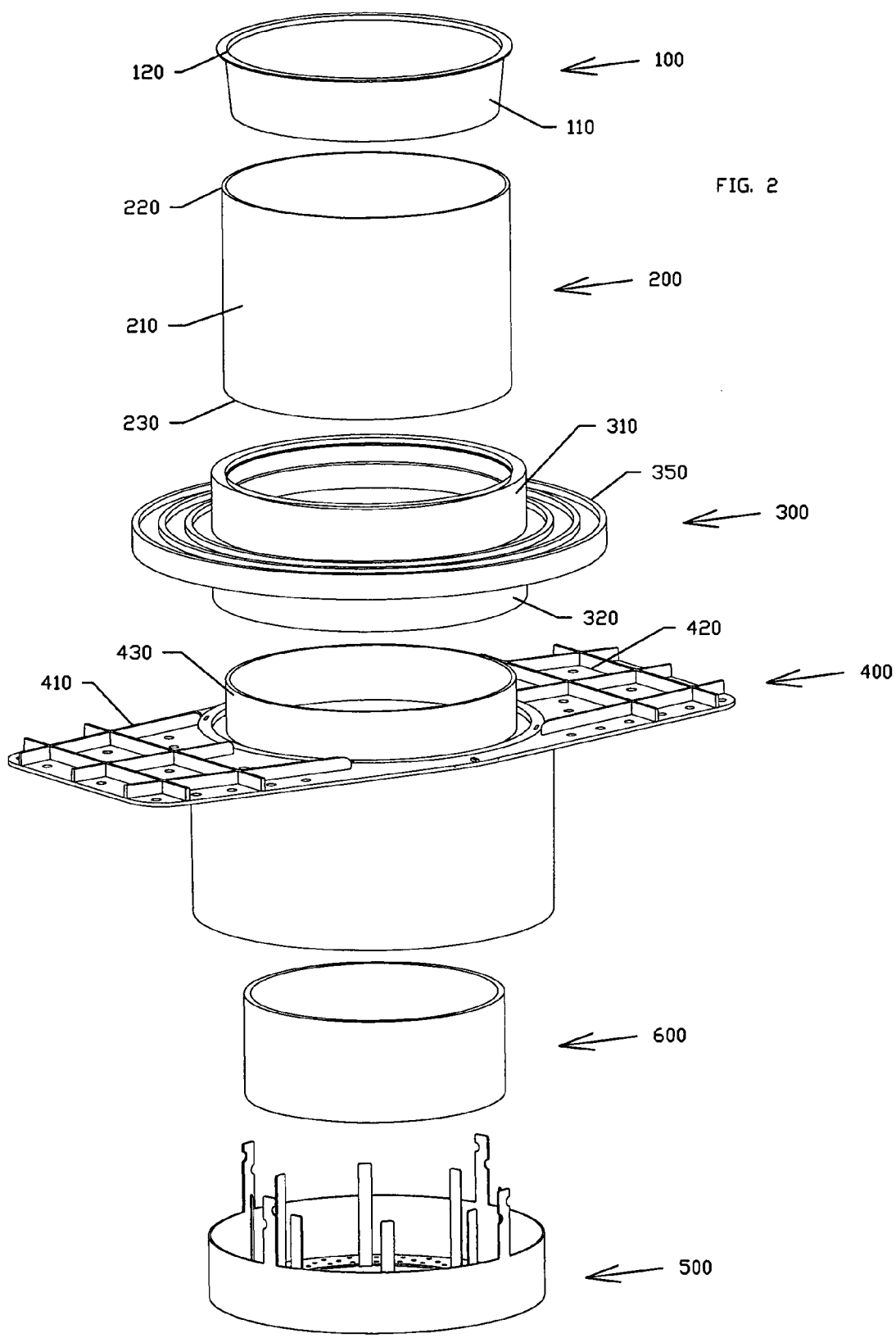
FIG. 2 is an exploded perspective side view of the one-piece corrugated deck assembly of FIG. 1, with top cap for protection during concrete pour.

FIG. 2 is an exploded perspective side view of the corrugated deck assembly of FIG. 1, with top cap for protection during concrete pours 100 separated from the top sleeve extension 200, the deck wing base 400, fire stop material 600 and fire ring 500.

Figure 3:
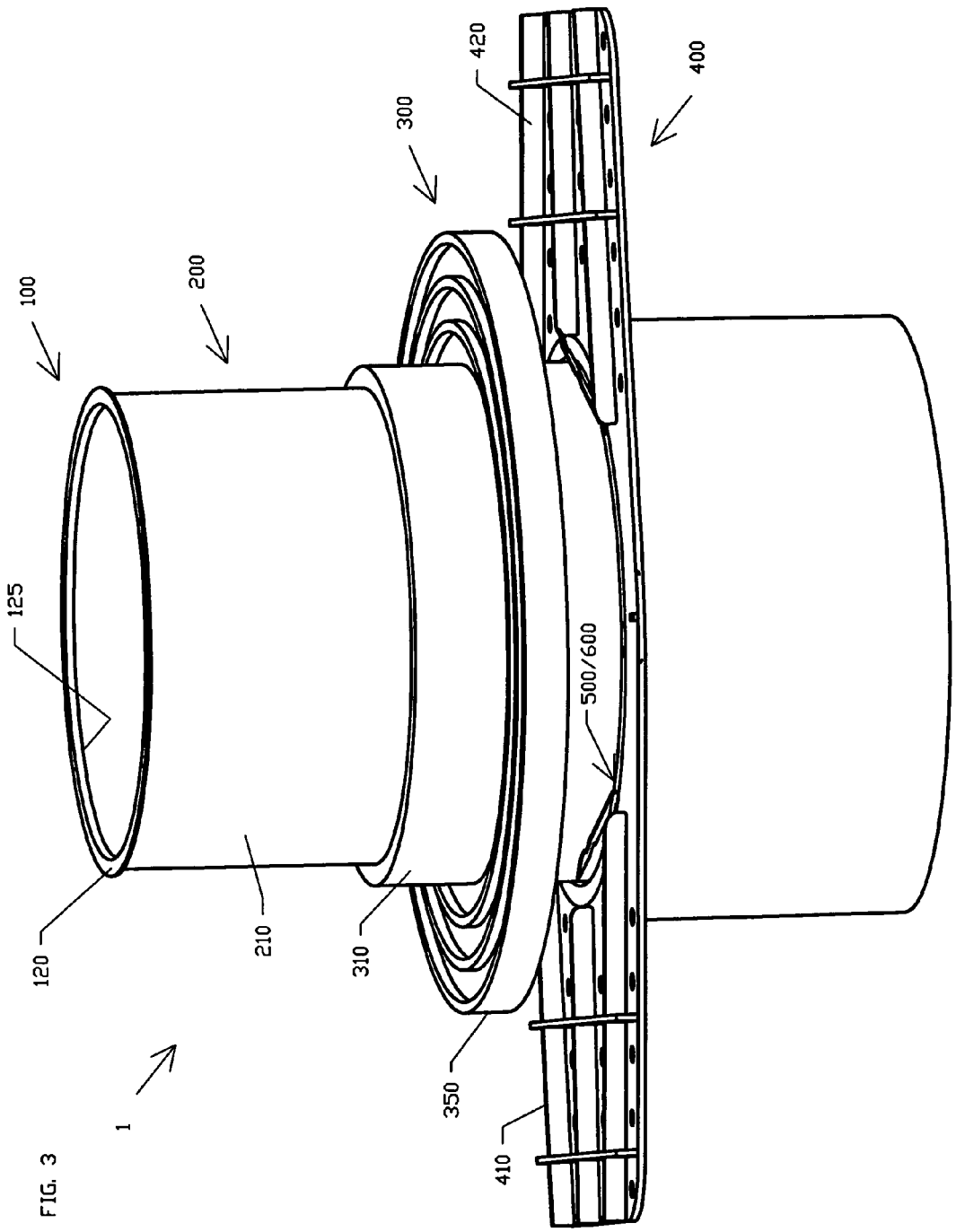
FIG. 3 is a perspective side view of the top cap, top sleeve extension, mid-body seal, corrugated deck wing base, fire stop ring with material of FIGS. 1-2 pre-attached as one-piece assembly.

FIG. 3 is a perspective side view of the one-piece sleeve corrugated deck assembly embodiment 1 assembled together that includes the top cap 100, top sleeve extension 200, mid-body seal 300 and deck wing base 400 with fire stop material 500 clipped on by fire ring 500, of the preceding figures interconnected with one another.

Figures 4, 4A:
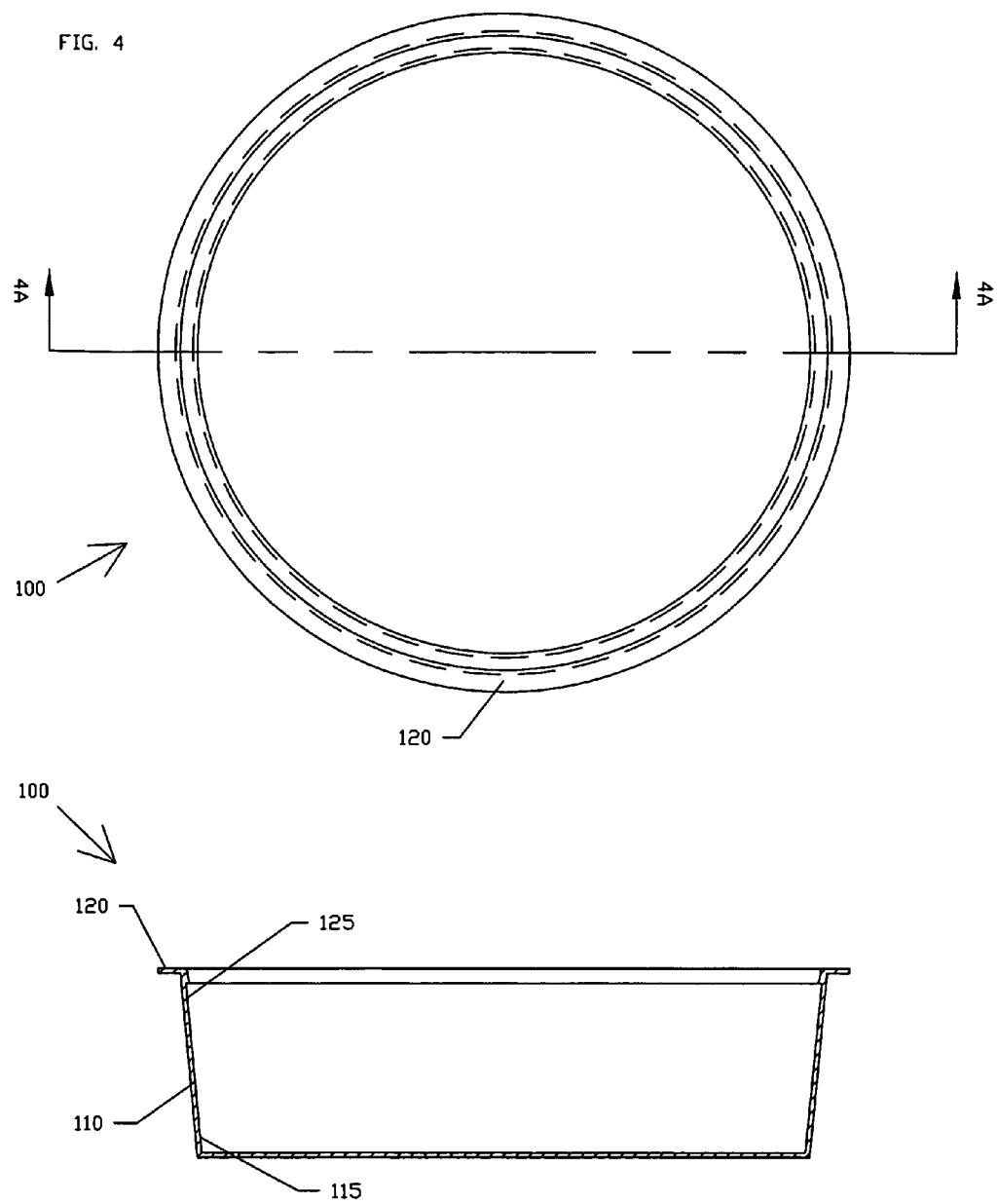
FIG. 4 is a top view of the top cap for protection during concrete pour of FIG. 2.
FIG. 4A is a cross-sectional view of the top cap of FIG. 4 along arrows 4A.

FIG. 4 is a top view of the top cap 100 of FIG. 2 which can be formed from ABS plastic, PVC, and the like, and includes generally conical shaped sidewalls 110 with an open bottom 115, with the sidewalls 110, enlarging to an upper open top 125 with a lip edge 120 extending outward from the perimeter of the open top 125. FIG. 4A is a cross-sectional view of the top cap 100 of FIG. 4 along arrows 4A. Referring to FIGS. 2-4A, the top cap 100 fits into the upper end of the cylindrical top sleeve extension 200 so that the upper lip 120 sits on top of the upper edge 220 of the top sleeve extension 200.

Figure 5:
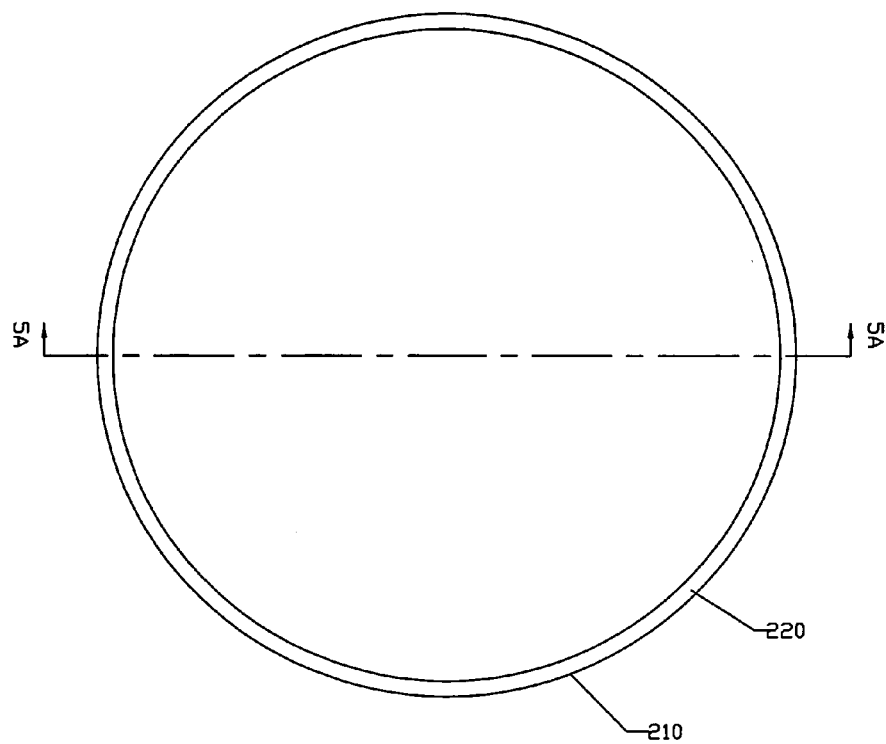
FIG. 5 is a top view of the top sleeve extension of FIGS. 1-3.
Figure 5A:
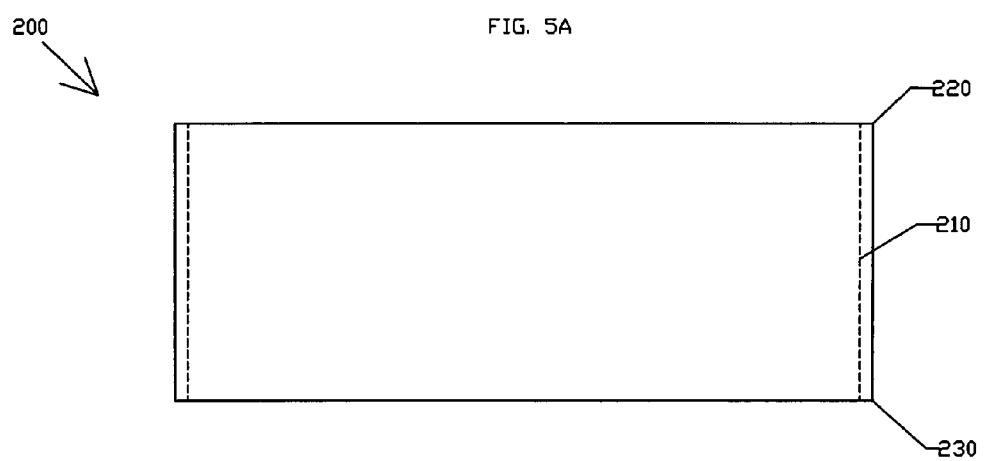
FIG. 5A is a cross-sectional view of the top sleeve extension of FIG. 5 along arrows 5A.

FIG. 5 is a top view of the top sleeve extension 200 of FIGS. 1-3 that can be formed from ABS plastic, PVC, and the like. FIG. 5A is a cross-sectional view of the top sleeve extension 200 of FIG. 5 along arrows 5A. Hollow top sleeve extension includes cylindrical sidewalls 210, upper edge 220, and lower edge 230. Referring to FIGS. 1-3, 5 and 5A, the bottom edge 230 of top sleeve extension 200 fits within the upper open end 310 of mid-body seal member 300 and rests against the upper ledge surface 342 of inwardly protruding seal ring 340.

Figure 6:
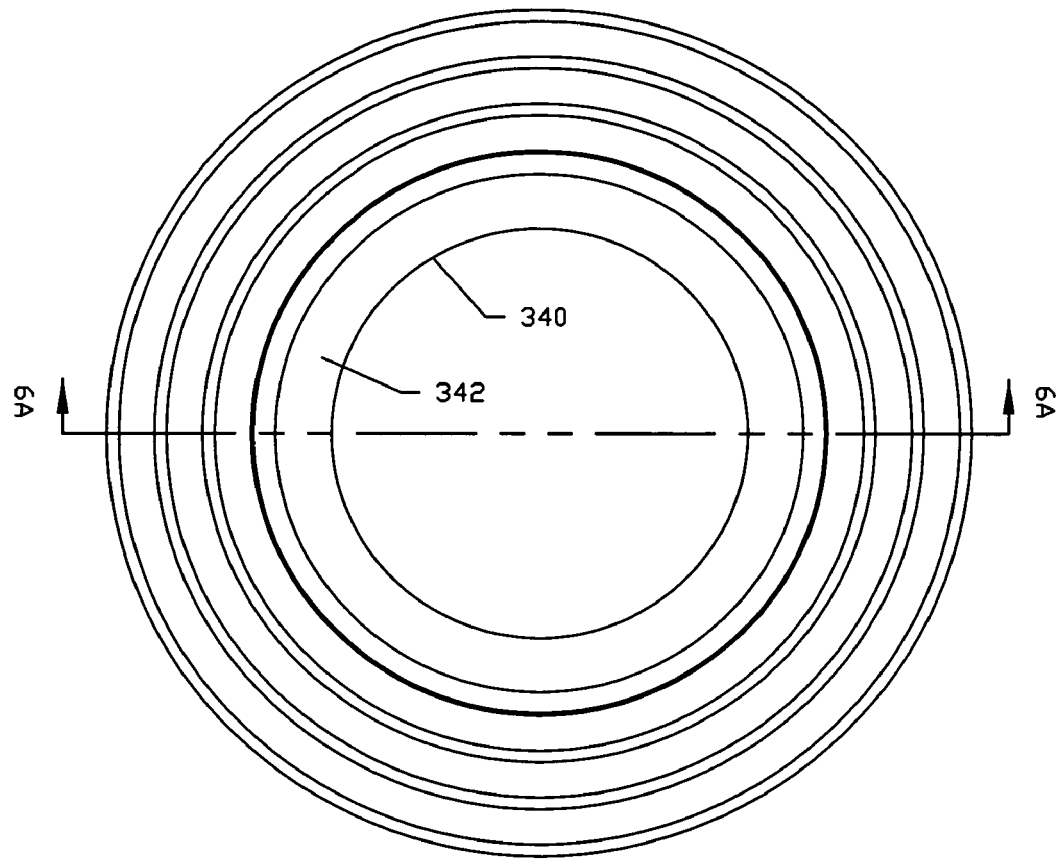
FIG. 6 is a top view of the mid-body seal of FIGS. 1-3.
Figure 6A:
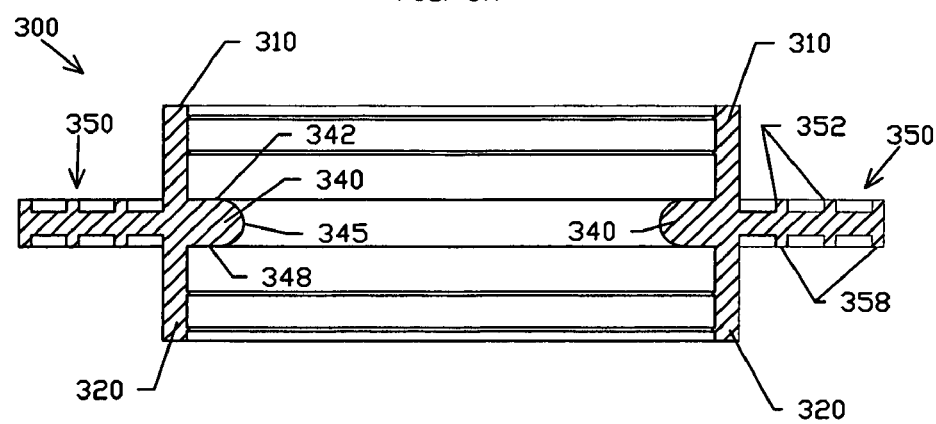
FIG. 6A is a cross-sectional view of the mid-body seal of FIG. 6 along arrows 6A.

FIG. 6 is a top view of the mid-body seal 300 of FIGS. 1-3. FIG. 6A is a cross-sectional view of the mid-body seal 300 of FIG. 6 along arrows 6A. The mid-body seal is a modified version of the hollow resilient member shown and described in U.S. Pat. No. 6,792,726 to Price, which is the same inventor as that of the subject invention, and which is incorporated by reference. The mid-body seal 300 is a resilient flexible sealing sleeve that can be formed from rubber, elastomer, similar compositions, and the like. Mid-body seal 300 can include an upper open cylindrical end 310, lower open cylindrical end 320, and an inwardly protruding seal ring 340 formed therebetween. The seal ring 340 can have an upper ledge surface 342 with rounded inner edge 345 on seal ring 340, and a lower ledge surface 348. Mid-body seal 300 includes an outwardly extending Mid-Body Seal Ring 350 with upper raised ridges and grooves for sealing and securing ring into the concrete 352 and lower raised ridges and grooves for sealing and securing ring into the concrete 358. A side cross-sectional view of the upper end 310, lower end 320, Mid-Body Seal Ring 350 and inwardly protruding seal ring 340 forms a generally t-shape. A preferred embodiment can have three concentric rings of raised ridges and grooves on each of the upper and lower surfaces of the outwardly extending Mid-Body Seal ring 350.

Referring to FIGS. 1-3, 6 and 6A, the lower open cylindrical end 320 of the mid-body seal 300 is inserted around the upper small cylindrical ring 430 of the deck wing base 400 so that that the lower cylindrical end 320 fits tightly around and about the upper ring 430, and the top edge 432 of the upper ring can abut against the lower ledge surface 348 of the seal ring 340 in the mid-body seal 300. When concrete 40 is poured on the corrugated deck 10, the concrete locks around both sides of the Mid-Body Seal Ring 350 and fits around and into the upper raised ridges and grooves 352, and the lower raised ridges and grooves 358 forming a durable tight seal against water, liquids, smoke, gasses, and the like and also secures the device into the concrete. The upper raised ridges and grooves 352 can trap any water, fluid, and the like, that passes between the outside of upper open cylindrical end 310 and the poured concrete 40. The rounded inner edge 345 on seal ring 340 has a diameter that is sized to tightly rub against the outer walls of the pipe 50 that passes through the seal ring 340.

FIG. 7 is a top view of the deck wing base 400 of FIGS. 1-3 that can be formed from ABS plastic, and the like. FIG. 7A is a cross-sectional view of the deck wing base 400 of FIG. 7 along arrows 7A. Deck wing base 400 can include Left wing 410 having outwardly parallel strengthening ribs 412 and cross parallel strengthening ribs 418. Deck base 400 can also have a Right wing 420 having outwardly parallel strengthening ribs 422 and cross parallel strengthening ribs 428. Small through-holes 415 are used for securing the wings 410, 420 to the surface 12 of the corrugated deck 410 with screws.

The strengthening ribs 412, 418, 422, 428 make the wings sturdy so that the wings 410, 420 will not bend up or down more than a few degrees, and will allow the one-piece sleeve assembly 1 to be secure and to effectively seal in place when the concrete 40 is poured on the corrugated deck 10 around the device.

Deck wing base can include a small diameter upper cylinder ring 430 with top edge 432 protruding upwardly from the wings 410, 420, and a large diameter lower cylinder ring 440 with lower bottom edge 448. A series of slot openings 450 allows for the upper ends 512 of the upwardly protruding prongs 510 of the fire ring clip 500 to pass therethrough and be bent back to hold the fire stop material 600 as is described below.

Referring to FIGS. 1-3, 7 and 7A, the wings 410, 420 of the deck wing base 400 overlays the raised surfaces 12 of the corrugated deck 10 on both sides of the deck wing base 400 when the one-piece assembly is positioned over the opening 20 in the corrugated deck 10 so that the large diameter cylindrical ring 440 extends below the corrugated deck 10. The wings 410, 420 have a long enough length to overlay the length of the lower surface valleys 14 of the corrugated deck 10. Each deck wing 410, 420 has a length (approximately 14" end to end) longer than the width of the lower surface valleys 14. The sturdiness of the deck wing base 400 allows for an effective seal with the corrugated deck 10 when the concrete 40 is poured in place.

Figure 8:
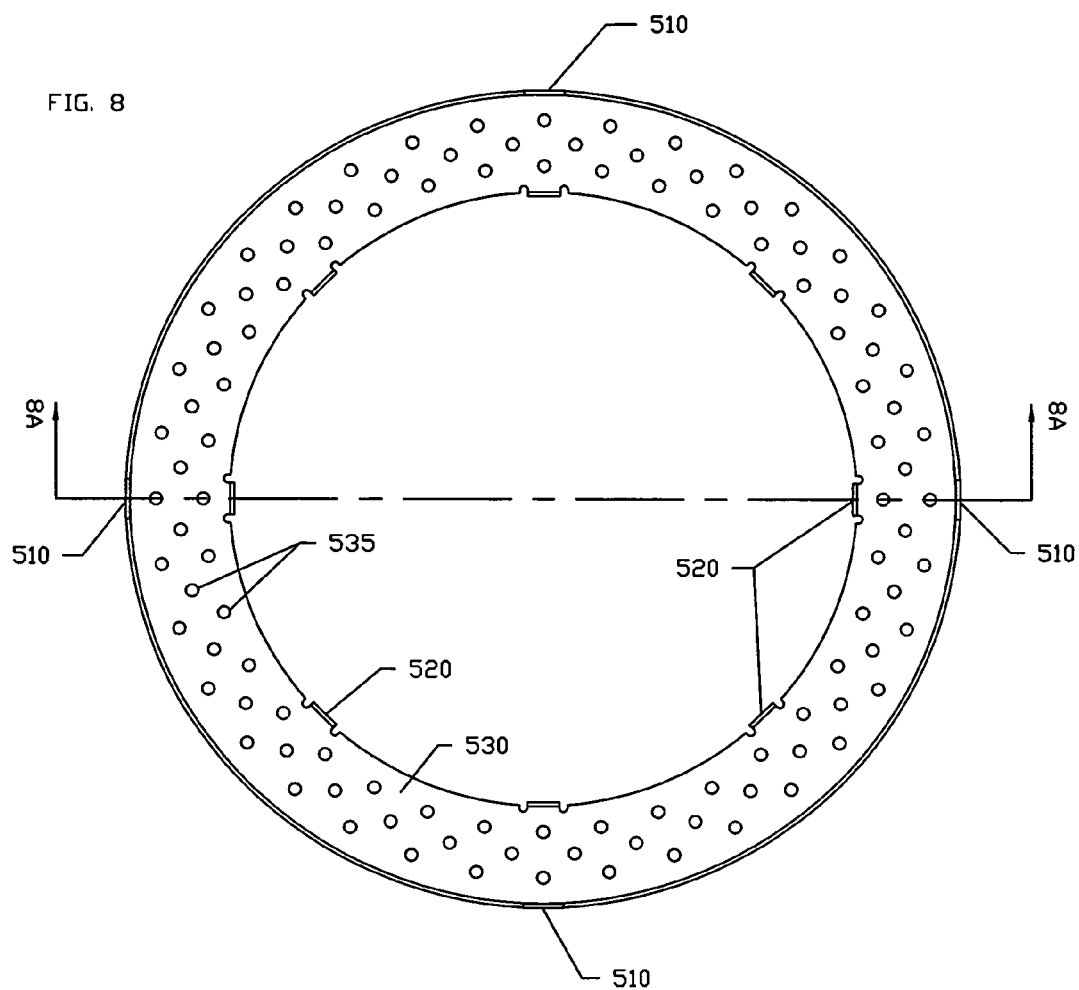
FIG. 8 is a top view of the fire ring without the fire stop material used in FIGS. 1-2.
Figure 8A:
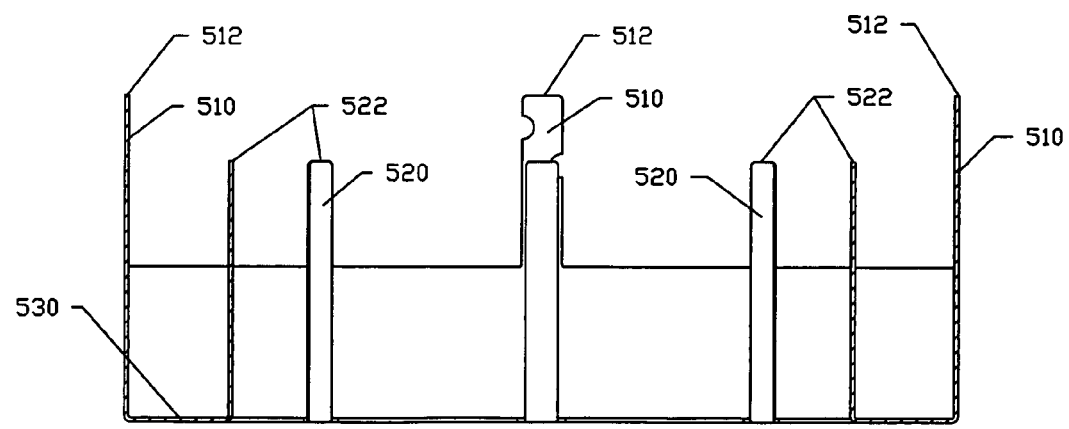
FIG. 8A is a cross-sectional view of the fire ring of FIG. 8 along arrows 8A.

FIG. 8 is a top view of the lire ring 500 without the fire stop material 600 used in FIGS. 1-2. FIG. 8A is a cross-sectional view of the fire ring 500 of FIG. 8 along arrows 8A. Fire ring 500 can be a clip type device metal formed from material such as but not limited to aluminum, galvanized metal, and the like. The fire stop material has been removed from FIGS. 8 and 8A in order to show the bottom base 530 and through-holes 535 in the tire ring 500. As described below and as shown in FIG. 1, the first stop material 600 is positioned to rest on the bottom base 530 of the fire ring 500. The fire stop material 600 can be an intumescence fire wrap that expands from the fire and heat to many times its size. With the heat expansion (intumescence), expansion can begin at approximately 410 F (approximately 210 C) with a significant expansion at approximately 555 F (approximately 290 C). Free expansion applies to approximately 25 times (within approximately 5 minutes @ approximately 662 F (approximately 350 F).

Fire ring 500 can include upwardly protruding bendable outer prongs 510 with upper ends 512 and upwardly protruding inner tabs 520 with upper ends, and a bottom base 530 connects the bases of outer prongs 510 to base of the inner tabs 520. Through-holes 535 are in the bottom base of the fire ring 530, the latter of which can support and hold the fire stop material 600 in place.

Referring to FIGS. 1-3, 7, 7A, 8 and 8A, the fire stop material 600 is positioned to rest on the bottom base of fire ring 530 between the inner tabs 520 and the outer prongs 510. Next, the upper ends 512 of the outer prongs 510 are inserted through the slot openings 450 of in the deck base 400. The upper ends 512 of the prongs 510 are than bent outward as shown in FIG. 1 to attach the fire ring clip 500 to the deck base 400 and hold the fire stop material/wrap in a cylindrical orientation about the pass through pipe 50. As previously described, heat causes the fire stop material/wrap 600 to expand which will further cause a seal between the outer walls of pipe 50 and also help collapse the nonmetallic pipe when it starts to melt from the fire and heat, and fill the void around metallic pipe and the upper ring 430 of deck base 400 forming another seal against smoke and fire that could pass between the pipe 50 and the opening 20 in the corrugated deck floor 10.

Figure 9:
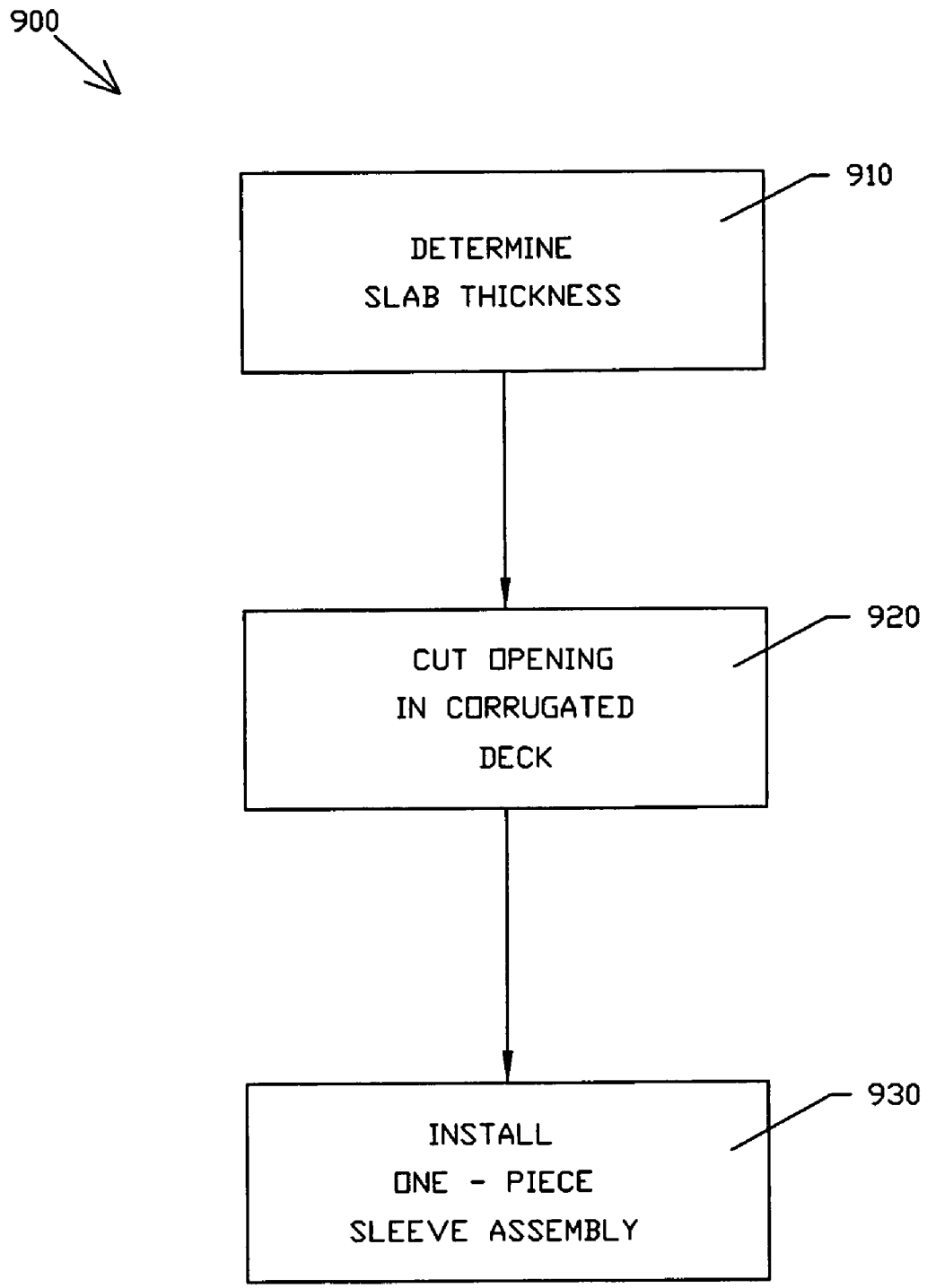
FIG. 9 is a flowchart of the basic assembly steps for installing the novel one-piece sleeve into a corrugated floor deck.

FIG. 9 is a flowchart 900 of the three basic assembly steps for installing the novel one-piece sleeve into a corrugated floor deck. The steps can include determining the slab thickness of the concrete floor, Step 1(910), cutting an opening in the corrugated deck, Step 2(920), and the final step of installing the one-piece sleeve assembly 1, Step 3(930).

Figure 10B:
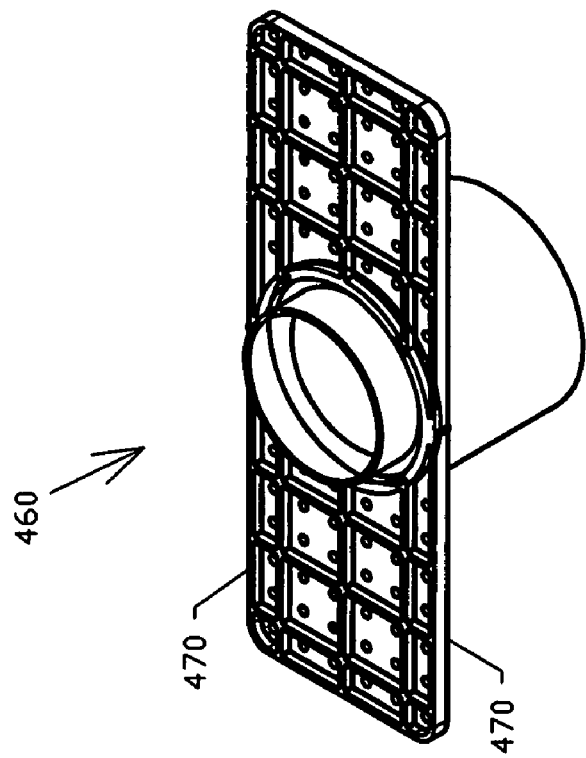
FIG. 10B is an upper right perspective view of the corrugated deck wing base of FIG. 10A.
Figure 10A:
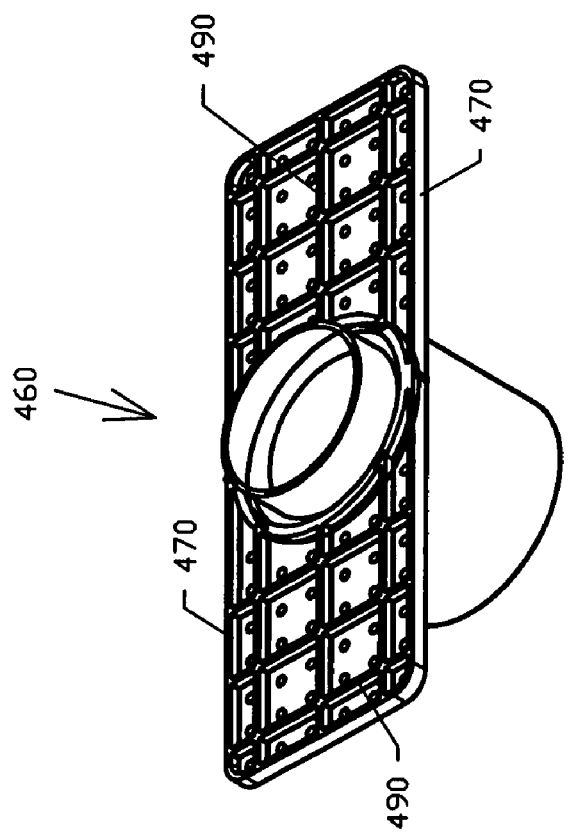
FIG. 10A is an upper left perspective view of another corrugated deck wing base.

FIG. 10A is an upper left perspective view of another corrugated deck wing base 460. FIG. 10B is an upper right perspective view of the corrugated deck wing base 460 of FIG. 10A. FIG. 10C is a top view of the corrugated deck wing base 460 of FIGS. 10A-10B. FIG. 10D is an end cross-sectional view of the corrugated deck wing base 460 of FIG. 10C along arrow 10D. FIG. 10E is a side cross-sectional view of the corrugated deck wing base 460 of FIG. 10C along arrow 10E.

Referring to FIGS. 1-10E, another version of the corrugated deck wing base 460 can be substituted for the deck wing base 400 previously described. Both deck wing bases 400, 460 have the similar components with the exception that deck wing base 460 includes extra strengthening ridges/ribs 470 running about the perimeter of the wings, and the crossed parallel raised ridges./ribs 480, 490 define rectangular sections that also can aid in further strengthening of the wings. Deck wing base 460 can be used with the installation method steps and assembled one-piece device 1 that was previously described.

Table 1 shows comparisons of the installation steps between the invention (Presealed Systems) and a Prior Art system (Hilti system described in the background of the subject invention.

TABLE 1

FOR INSTALLATION COMPARISONS

| Presealed Systems | | 1" PVCdrain pipe | Hiti | Minutes Additional Labor |
|---|---|---|---|---|
| Step 1 | Determine slab thickness 9¾" | Step 1 | Determine slab thickness | |
| | Additional Material needed? | Step 2 | Get Extension Tube | 1 |
| | | Step 3 | Get Coupling | 1 |
| | Additional Labor needed | Step 4 | Remove Cap | 1 |
| | | Step 5 | Cut Device | 5 |
| | | Step 6 | Attach Water module Cut Extension or insert cut | 1 |
| | | Step 7 | piece from main body into | 5 |
| | | Step 8 | Attach Extension | 1 |
| | | Step 9 | Re-Attach Cap | 1 |
| Step 2 | Cut Opening in Floor | Step 10 | at Cpening in Floor | |
| Step 3 | Install Sleeve | Step 11 | Install Seeve | |
| | Water tight an issue? Y/N | | | |
| | Additional Material needed | | Water Module Top plug Extension Flates & Tube | |
| | Additional Labor needed | Step 12 | Install Deck tube | 1 |
| | | Step 13 | Install Deck Plates | 2 |
| | Pour Concrete | Step 14 | Break out cap | 3 |
| | | Step 15 | Clean opening | 5 |
| Step 4 | Install Pipe | Step 16 | Install Pipe | |
| | | Step 17 | Drive in top plug Install RIser damp if necessary | 2 |
| | | | TOTAL | 29 |

This comparison shows that it takes four steps to install our device and 17 to install the Hilti device. If each step costs one dollar, figuring a $60 per hour labor rate, (many steps cost more, such as cleaning the opening and cutting the device, which could require as much as five minutes) the Hilti device cost $23 and Presealed Systems, Hydroflame deck device cost $17. The Hilti device is still not water proof on the outside. In addition to all of these steps, the contractor must carry them all over the project and figure out where they go.

This also compares favorably to core drilling a hole in the finished floor for $50 and firestopping the opening for $15, after the installation of the pipe. After the installation of the caulk, the W-Rating does not become effective until a full 28 day cure. This comparison is true for all pipe sizes up to 1½". 80% of all piping sold is 2" and below. So it figures that the above system is used a lot. If watertight is required by the specifications or by the owner it is an issue. If the contractor wants to provide water tight it is an issue. If everyone is trying to do everything as cheap as possible and as little as possible they will avoid providing a water seal.

Table 2 shows comparisons of the installation steps between the invention (Presealed Systems) and a Prior Art system (3M system described in the background of the subject invention.

TABLE 2

FOR INSTALLATION COMPARISONS

| | Presealed Systems | 1" PVCdrain pipe | 3M |
|---|---|---|---|
| Step 1 | Determine slab thickness 9¾" | Step 1 | Determine slap thickness |
| Step 2 | Cut Opening in Floor | Step 2 | Cut Opening in Floor |
| Step 3 | Install Sleeve | | |
| | Additional Material needed? | Step 3 | Get Extension Tube |
| | | Step 4 | Get Deck Adapter |
| | Additional Labor needed | Step 5 | Remove Cap |
| | | Step 6 | Cut Device |
| | | Step 7 | Attach Deck Adapter |
| | | Step 8 | Attach Extension |
| | | Step 9 | Install Sleeve |
| | Water tight an issue? Y/N | | |
| | Additional Material needed | Step 10 | Get Mineral Wool |
| | | Step 11 | Get Caulk |
| | Additional Labor needed Pour Concrete | | |
| | | Step 12 | Cut Extension even with floor |
| Step 4 | Install Pipe | Step 13 | Install Pipe Install Riser damp if necessary |
| | | Step 14 | Clean opening & pipe |
| | | Step 15 | Install Mineral wool |
| | | Step 16 | Install caulk |

Referring to Table 2, this comparison shows that it takes four steps to install our device and 16 to install the 3M device. If each step costs one dollar, figuring a $60 per hour labor rate, (many steps cost more, such as cleaning the opening and cutting the device, which could require as much as five minutes) the 3M device cost $27 and Presealed Systems, Hydroflame deck device cost $17. The 3M device is still not water proof on the outside. In addition to all of these steps, the contractor must carry them all over the project and figure out where they go. This also compares favorably to core drilling a hole in the finished floor for $50 and fire stopping the opening for $15, after the installation of the pipe.

After the installation of the caulk, the W-Rating does not become effective until a full 28 day cure. This comparison is true for all pipe sizes up to 1½". 80% of all piping sold is 2" and below. So it figures that the above system is used a lot.

Tables 3 and 4 shows comparisons of the labor costs between the invention (Presealed Systems) and a Prior Art system (Hilti system and 3M systems described in the background of the subject invention

TABLE 3

COMPARISON FOR LABOR COSTS PRESEALED vs. HILTI

| Condition for Device | Presealed Deck Device | Additional Labor | Hilti for metal deck | Additional Labor |
|---|---|---|---|---|
| | Acts as Temporary Riser clamp Components Needed | | Requires Riser additional support Components Needed | |
| For 8" deep concrete pour | One Piece | None | 4 Pieces | 5 min |
| For 6" deep concrete pour | One Piece | None | 4 pieces pluscut | 10 Min |
| For 9" pour | One Piece | None | 4 pieces plus extension and cut mineral wool, water module, top plug | 15 min |
| 1" pipe For Water tight annular space W-Rating | One piece | None | | 20 min |
| 2" pipe For Water tight annular space | One piece | None | 4 pieces, plus, mineral wool, water module, Additional pipe support needed | 15 min |
| Direction of pipe installation | Both directions | None | from bottom only | difficult to maintain seal |
| For watertight concrete interface | One piece | None | not applicable | |
| Smoke Tight smaller than 1½" pipe | One piece | None | 4 pieces, plus, mineral wool, water module, top plug | 20 min |
| Additional labor to clean and dry opening for caulking | | | None | 5 min |

TABLE 4

COMPARISON FOR LABOR COSTS PRESEALED vs. 3M

| Condition for Device | Presealed Deck Device | Additional Labor | 3M for Metal deck | Additional Labor |
|---|---|---|---|---|
| | Acts as Temporary Riser clamp Components Needed | | Requires Riser additional support Components Needed | |
| For 8" deep concrete pour | One Piece | None | 2 pieces | 2 min |
| For 6" deep concrete pour | One Piece | None | 2 piecesplus cut | 4 min |
| For 9" pour | One Piece | None | 2 piecesplus extension and cut 2 piecesplus mineral wool and caulk | 10 min |
| 1" pipe For Water tight annular space W-Rating | One piece | None | 2 piecesplus mineral wool and caulk, Additional pipe support needed | 15 min |
| 2" pipe For Water tight annular space | One piece | None | | 15 min |
| Direction of pipe installation | Both directions | None | Both directions | |
| For watertight concrete interface | One piece | None | caulk on surface 2 piecesplus mineral wool and caulk | 5 min |
| Smoke Tight smaller than 1-½" pipe | One piece | None | | 15 min |
| Additional labor to clean and dry opening for caulking | | None | | 5 min |

TABLES 5 and 6 show comparisons of the material costs for a multistory office building and a condominium building using the invention (Presealed) against the prior art Hilti and 3M devices.

TABLE 5

CONDO BUILDING

| CONDO BUILDING | Sleeves | Presealed $17 | Hilti $12 | Adt'l Labor $60 hr 13 min | 3M $15 | Adt'l Labor $60 hr 12 min |
|---|---|---|---|---|---|---|
| 1st Floor | 0 | | | | | |
| 2nd Floor | 250 | $4,250.00 | $3,000.00 | $3.250.00 | $3,750.00 | $3,000.00 |
| 3rd Floor | 250 | $4,250.00 | $3,000.00 | $3.250.00 | $3,750.00 | $3,000.00 |
| 4th Floor | 250 | $4,250.00 | $3,000.00 | $3.250.00 | $3,750.00 | $3,000.00 |
| 5th Floor | 250 | $4,250.00 | $3,000.00 | $3.250.00 | $3,750.00 | $3,000.00 |
| 6th Floor | 250 | $4,250.00 | $3,000.00 | $3.250.00 | $3,750.00 | $3,000.00 |
| 7th Floor | 250 | $4,250.00 | $3,000.00 | $3.250.00 | $3,750.00 | $3,000.00 |
| 8th Floor | 250 | $4,250.00 | $3,000.00 | $3.250.00 | $3,750.00 | $3,000.00 |
| 9th Floor | 250 | $4,250.00 | $3,000.00 | $3.250.00 | $3,750.00 | $3,000.00 |
| 10th Floor | 250 | $4,250.00 | $3,000.00 | $3,250.00 | $3,750.00 | $3,000.00 |
| TOTAL | | | $27,000.00 | $29,250.00 | $33,750.00 | $27,000.00 |
| | | $38,250.00 | | $56,250.00 | | $60,750.00 |

TABLE 6

OFFICE BUILDING

| Office Building | Presealed $17 | Hilti $12 | Adt'l Labor $60 hr 13 min | 3M $15 | Adt'l Labor $60 hr 12 min |
|---|---|---|---|---|---|
| 1st Floor | 0 Sleeves | | | | |
| 2nd Floor | 50 | $850 | $600 | $650 | $750 | $600 |
| 3rd Floor | 50 | $850 | $600 | $650 | $750 | $600 |
| 4th Floor | 50 | $850 | $600 | $650 | $750 | $600 |
| 5th Floor | 50 | $850 | $600 | $650 | $750 | $600 |
| 6th Floor | 50 | $850 | $600 | $650 | $750 | $600 |
| 7th Floor | 50 | $850 | $600 | $650 | $750 | $600 |
| 8th Floor | 50 | $850 | $600 | $650 | $750 | $600 |
| 9th Floor | 50 | $850 | $600 | $650 | $750 | $600 |
| 10th Floor | 50 | $850 | $600 | $650 | $750 | $600 |
| Total | | | $5,400 | $5,850 | $6,750 | $6,400 |
| | | | $7,650 | | $11,250 | $12,150 |

The above Tables are cost comparisons for typical building construction. They show, typically, how many sleeves that can be required and the cost differences between using the Preseal (subject invention) system and the other brands of systems which require mare labor to install. The tables further elaborate the advantages and benefits of the subject invention novel one-piece assembly and novel installation method steps.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A one piece sleeve assembly for through-hole openings in corrugated decks, the one-piece assembly comprising:
    a resilient sealing member with perimeter extending side walls extending from a central opening;
    a deck base having outwardly extending wings extending from another central opening that is aligned with the central opening of the resilient member, the deck base having an upper cylinder extending upwardly from the another central opening, and the deck base having a lower cylinder extending downwardly from the another central opening, the lower cylinder having a larger interior diameter than the upper cylinder; and a fire stop material clipped in place to encircle the central opening of the deck base, the fire stop material extending above the wings of the deck base and into the upper cylinder, and the fire stop material extending below the wings of the deck base and into the lower cylinder, wherein the clipped fire stop material includes:
    a ring having upwardly protruding bendable outer prongs and upwardly protruding inner tabs, the upwardly protruding bendable outer prongs secure the ring to the deck base; and
    a sleeve of the fire stop material that is positioned on the ring between the upwardly protruding outer prongs and the upwardly protruding inner tabs, wherein the ring holds the sleeve within the downwardly extending lower cylinder and the upwardly extending upper cylinder of the deck base.

2. The one-piece sleeve assembly of claim 1, wherein the resilient sealing member includes:
    an upper cylindrical portion extending above the perimeter extending side walls;
    a lower cylindrical portion extending below the perimeter extending side walls; and
    an interior facing edge extending inwardly therebetween.

3. The one-piece sleeve assembly of claim 2, wherein the resilient sealing member includes:
    raised ridges on at least one surface of the perimeter extending side walls.

4. The one-piece sleeve assembly of claim 2, wherein the one-piece sleeve assembly further includes:
    an upper tubular sleeve extension that fits into the upper cylindrical portion of the resilient member and a bottom of the sleeve extension rests on the interior facing edge.

5. The one-piece sleeve assembly of claim 4, wherein the one-piece sleeve assembly further includes:
    a cap member that attaches about an upper end of the sleeve extension having a raised upper edge that fits on the upper end of the sleeve extension.

6. The one-piece sleeve assembly of claim 4, wherein each of the wings of the deck base includes:
    raised strengthening ribs on perimeter edges of the wings.

7. The one-piece sleeve assembly of claim 4, wherein each of the wings of the deck base includes:
    raised parallel ribs along at least one surface of the wings.

8. A one piece sleeve assembly for a pipe pass-through in a through-hole opening in a corrugated deck, the one-piece assembly comprising:
    a resilient sealing member with perimeter extending side walls extending sideways from a central opening;
    a deck base having outwardly extending wings extending from another central opening that is aligned with the central opening of the resilient member, the wings being extended to overlay portions of raised surfaces on both sides of the through-hole opening in the corrugated deck;
    a fire ring having upwardly protruding bendable outer prongs and upwardly protruding inner tabs, the upwardly protruding bendable outer prongs secures the fire ring to the deck base; and
    a fire stop material sleeve that is positioned on the ring between the upwardly protruding outer prongs and the upwardly protruding inner tabs, the ring being clipped to the deck base, wherein a pipe within the through-hole of the corrugated deck is sealed by the resilient sealing member which prevents space about an outer perimeter exterior of the pipe from allowing water, smoke and fire to pass therethrough, and the fire and smoke is further prevented from passing about the outer perimeter exterior by the fire stop material sleeve which expands in size from heat.

9. The one-piece sleeve assembly of claim 8, wherein the resilient sealing member includes:
    an upper cylindrical portion extending above the perimeter extending side walls;
    a lower cylindrical portion extending below the perimeter extending side walls; and
    an interior facing edge extending inwardly therebetween.

10. The one-piece sleeve assembly of claim 1, wherein the deck base includes:
    slot openings on the wings adjacent to the another opening, wherein tips of the upwardly protruding bendable outer prongs are inserted through the slot openings and bent, in order to clip the ring to the deck base.

11. The one-piece sleeve assembly of claim 8, wherein the deck base includes:
   slot openings on the wings adjacent to the another opening, wherein tips of the upwardly protruding bendable outer prongs are inserted through the slot openings and bent, in order to clip the ring to the deck base.

12. The one-piece sleeve assembly of claim 8, wherein the deck base includes:
   an upper cylinder extending upwardly from the another central opening, and the deck base having a lower cylinder extending downwardly from the another central opening, the upper cylinder having a smaller interior diameter than the lower cylinders.

13. A one piece sleeve assembly for through-hole openings in corrugated decks, the one-piece assembly consisting of:
   a resilient sealing member with perimeter extending side walls extending from a central opening;
   a deck base having outwardly extending wings extending from another central opening that is aligned with the central opening of the resilient member, the deck base having an upper cylinder extending upwardly from the another central opening, and the deck base having a lower cylinder extending downwardly from the another central opening, the lower cylinder having a larger interior diameter than the upper cylinder, the deck base having slot openings in the wings;
   a fire ring having upwardly protruding bendable outer prongs and upwardly protruding inner tabs; and
   a fire stop material sleeve that is positioned on the ring between the upwardly protruding outer prongs and the upwardly protruding inner tabs, wherein tips of the upwardly protruding bendable outer prongs are inserted through the slot openings and bent, in order to clip the ring with the fire stop material to the deck base.

\* \* \* \* \*